United States Patent
Kim et al.

(10) Patent No.: US 10,470,194 B2
(45) Date of Patent: Nov. 5, 2019

(54) METHOD FOR TRANSMITTING INTERFERENCE DOWNLINK CONTROL INFORMATION IN A WIRELESS COMMUNICATION SYSTEM AND APPARATUS THEREFOR

(71) Applicant: LG ELECTRONICS INC., Seoul (KR)

(72) Inventors: Kijun Kim, Seoul (KR); Hyungtae Kim, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/558,532

(22) PCT Filed: Apr. 8, 2016

(86) PCT No.: PCT/KR2016/003712
§ 371 (c)(1),
(2) Date: Sep. 14, 2017

(87) PCT Pub. No.: WO2016/163807
PCT Pub. Date: Oct. 13, 2016

(65) Prior Publication Data
US 2018/0084559 A1    Mar. 22, 2018

Related U.S. Application Data

(60) Provisional application No. 62/144,950, filed on Apr. 9, 2015.

(51) Int. Cl.
*H04W 4/00*    (2018.01)
*H04W 72/08*    (2009.01)
(Continued)

(52) U.S. Cl.
CPC .......... *H04W 72/082* (2013.01); *H04B 7/26* (2013.01); *H04J 11/0023* (2013.01);
(Continued)

(58) Field of Classification Search
USPC ........................................ 370/329
See application file for complete search history.

(56) References Cited

U.S. PATENT DOCUMENTS 9,363,797 B2 * 6/2016 Freda ............... H04W 72/0406
2011/0069736 A1    3/2011 Coralli et al.
(Continued)

FOREIGN PATENT DOCUMENTS

CN    102186251    9/2011
CN    102448175    5/2012
(Continued)

OTHER PUBLICATIONS

PCT International Application No. PCT/KR2016/003712, Written Opinion of the International Searching Authority dated Jul. 28, 2016, 19 pages.
(Continued)

*Primary Examiner* — Farah Faroul
(74) *Attorney, Agent, or Firm* — Lee Hong Degerman Kang Waimey

(57) ABSTRACT

A method for receiving interference downlink control information of a terminal equipped with an interference cancellation capability in a wireless communication system according to one embodiment of the present invention may comprise the steps of: receiving, from a base station, information regarding a transmission mode or method of candidate interference downlink control information; receiving, from the base station, as the transmission mode or method of the interference downlink control information, information indicating one from among the transmission mode or
(Continued)

method of candidate interference downlink control information, or a transmission mode or method identical to the downlink control information for the terminal itself; and detecting interference downlink control information by searching only the downlink control information of the indicated transmission mode or method of the interference downlink control information.

14 Claims, 7 Drawing Sheets

(51) Int. Cl.
  *H04B 7/26* (2006.01)
  *H04W 72/04* (2009.01)
  *H04J 11/00* (2006.01)
  H04W 88/08 (2009.01)
  H04W 72/12 (2009.01)

(52) U.S. Cl.
  CPC ....... *H04W 72/042* (2013.01); *H04W 72/044* (2013.01); *H04W 72/1289* (2013.01); *H04W 88/08* (2013.01)

(56) References Cited

U.S. PATENT DOCUMENTS

| | | | | |
|---|---|---|---|---|
| 2012/0322453 | A1* | 12/2012 | Weng | .................... H04W 72/02 455/450 |
| 2013/0114437 | A1 | 5/2013 | Yoo et al. | |
| 2013/0163543 | A1* | 6/2013 | Freda | ................ H04W 72/0406 370/329 |
| 2013/0196701 | A1* | 8/2013 | Tiirola | ................ H04J 11/0026 455/501 |
| 2014/0204807 | A1* | 7/2014 | Li | ............................ H04B 1/50 370/277 |
| 2015/0009964 | A1 | 1/2015 | Ellenbeck et al. | |
| 2015/0029958 | A1 | 1/2015 | Park et al. | |
| 2015/0078303 | A1* | 3/2015 | Jongren | ................ H04L 1/0026 370/329 |
| 2015/0098410 | A1* | 4/2015 | Jongren | ................ H04L 1/0026 370/329 |
| 2015/0098411 | A1* | 4/2015 | Jongren | ................ H04L 5/0073 370/329 |
| 2015/0181464 | A1* | 6/2015 | Lee | ........................ H04L 1/0026 370/329 |
| 2015/0295695 | A1* | 10/2015 | Davydov | ............... H04W 72/12 370/329 |
| 2015/0372777 | A1* | 12/2015 | Sano | ..................... H04J 11/004 370/329 |
| 2016/0234853 | A1* | 8/2016 | Yang | ..................... H04B 1/7097 |
| 2017/0085326 | A1* | 3/2017 | Li | ........................ H04B 17/345 |

FOREIGN PATENT DOCUMENTS

| | | |
|---|---|---|
| CN | 102754476 | 10/2012 |
| CN | 103222223 | 7/2013 |
| CN | 105099967 | 11/2015 |
| KR | 1020110048398 | 5/2011 |
| KR | 1020110136705 | 12/2011 |
| WO | 2011052869 | 5/2011 |
| WO | 2014123387 | 8/2014 |
| WO | 2015019743 | 2/2015 |
| WO | 2015044408 | 4/2015 |

OTHER PUBLICATIONS

European Patent Office Application Serial No. 16776910.8, Search Report dated Nov. 20, 2018, 9 pages.

* cited by examiner

FIG. 5
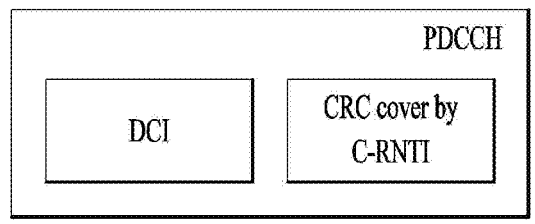
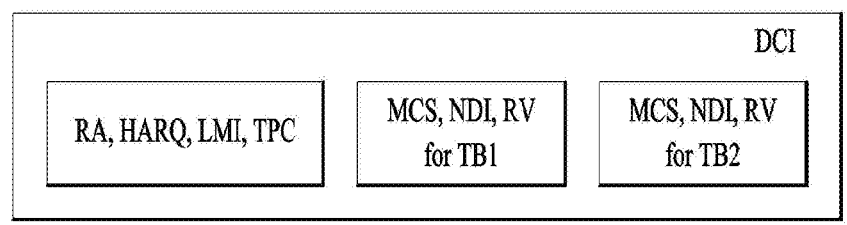
FIG. 6
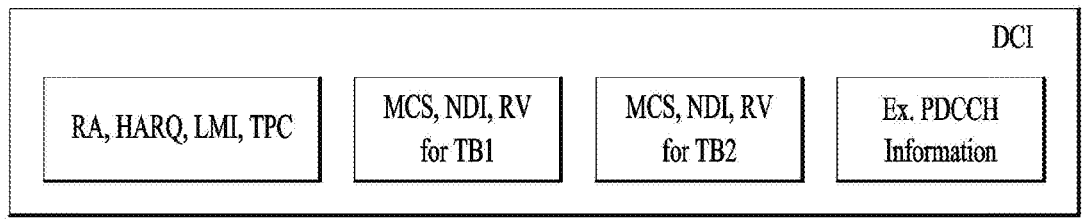

METHOD FOR TRANSMITTING INTERFERENCE DOWNLINK CONTROL INFORMATION IN A WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2016/003712, filed on Apr. 8, 2016, which claims the benefit of U.S. Provisional Application No. 62/144,950, filed on Apr. 9, 2015, the contents of which are all hereby incorporated by reference herein in their entirety.

TECHNICAL FIELD

The present invention relates to a wireless communication system, and more particularly, to a method for receiving interference downlink control information in a wireless communication system and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention is to suggest a method for efficiently supporting interference cancellation in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In a method for receiving interference downlink control information of a terminal having an interference cancellation capability in a wireless communication system according to one embodiment of the present invention, the method may comprise receiving, from a base station, information on transmission modes or schemes of candidate interference downlink control information; receiving, from the base station, as the transmission mode or scheme of the interference downlink control information, information indicating one of the transmission modes or schemes of the candidate interference downlink control information, or a transmission mode or scheme which is the same as downlink control information for the terminal; and detecting interference downlink control information by searching for only the downlink control information of the indicated transmission mode or scheme of the interference downlink control information.

Additionally or alternatively, the method may further comprise determining that the detected interference downlink control information is valid when a resource block allocation field of the detected interference downlink control information includes or is the same as a resource block allocation field of the downlink control information for the terminal.

Additionally or alternatively, the method may further comprise determining that the detected interference downlink control information is valid if an interference Cell Radio Network Temporary Identity (C-RNTI) derived from bits corresponding to the detected interference downlink control information belongs to a candidate interference C-RNTI set received from the base station.

Additionally or alternatively, the method may further comprise the step of deriving interference Cell Radio Network Temporary Identity (C-RNTI) from bits corresponding to the detected interference downlink control information, wherein the derived interference C-RNTI may be used to acquire a scrambling code for interference downlink data information scheduled by the interference downlink control information.

Additionally or alternatively, the information indicating the transmission mode or scheme may be included in a specific field of the downlink control information for the terminal.

Additionally or alternatively, the method may further comprise receiving information on an aggregation level or resource position of the interference downlink control information.

Additionally or alternatively, the aggregation level of the interference downlink control information may be greater than an aggregation level of the downlink control information for the terminal.

Additionally or alternatively, the method may further comprise reporting a capability of a maximum number of times of decoding the interference downlink control information of the terminal to the base station.

A terminal having an interference cancellation capability, configured to receive interference downlink control information in a wireless communication system comprises a radio frequency (RF) unit; and a processor controls the RF unit, wherein the processor may controls the RF unit to receive, from a base station, information on transmission modes or schemes of candidate interference downlink control information, controls the RF unit to receive, from the base station, as the transmission mode or scheme of the interference downlink control information, information indicating one of the transmission modes or schemes of the candidate interference downlink control information, or a transmission mode or scheme which is the same as downlink control information for the terminal, and detect interference downlink control information by searching for only the downlink control information of the indicated transmission mode or scheme of the interference downlink control information.

Additionally or alternatively, the processor may determine that the detected interference downlink control information is valid when a resource block allocation field of the detected interference downlink control information includes or is the same as a resource block allocation field of the downlink control information for the terminal.

Additionally or alternatively, the processor may determine that the detected interference downlink control information is valid when an interference Cell Radio Network Temporary Identity (C-RNTI) derived from bits corresponding to the detected interference downlink control information belongs to a candidate interference C-RNTI set received from the base station.

Additionally or alternatively, the processor may be configured to derive interference Cell Radio Network Temporary Identity (C-RNTI) from bits corresponding to the detected interference downlink control information, and the derived interference C-RNTI is used to acquire a scrambling code for interference downlink data information scheduled by the interference downlink control information.

Additionally or alternatively, the information indicating the transmission mode or scheme may be included in a specific field of the downlink control information for the terminal.

Additionally or alternatively, the processor may control to the RF unit to receive information on an aggregation level or resource position of the interference downlink control information.

Additionally or alternatively, the aggregation level of the interference downlink control information may be greater than an aggregation level of the downlink control information for the terminal.

Additionally or alternatively, the processor may report a capability of a maximum number of times of decoding the interference downlink control information of the terminal to the base station.

The above technical solutions are merely some parts of the embodiments of the present invention and various embodiments into which the technical features of the present invention are incorporated can be derived and understood by persons skilled in the art from the following detailed description of the present invention.

Advantageous Effects

According to one embodiment of the present invention, interference cancellation may efficiently be performed in a wireless communication system.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is diagram illustrating an example of a configuration of downlink control information used in a 3GPP LTE/LTE-A system;

FIG. 6 is diagram illustrating an example of a configuration of downlink control information according to one embodiment of the present invention;

BEST MODE FOR CARRYING OUT THE INVENTION

Figure 1:
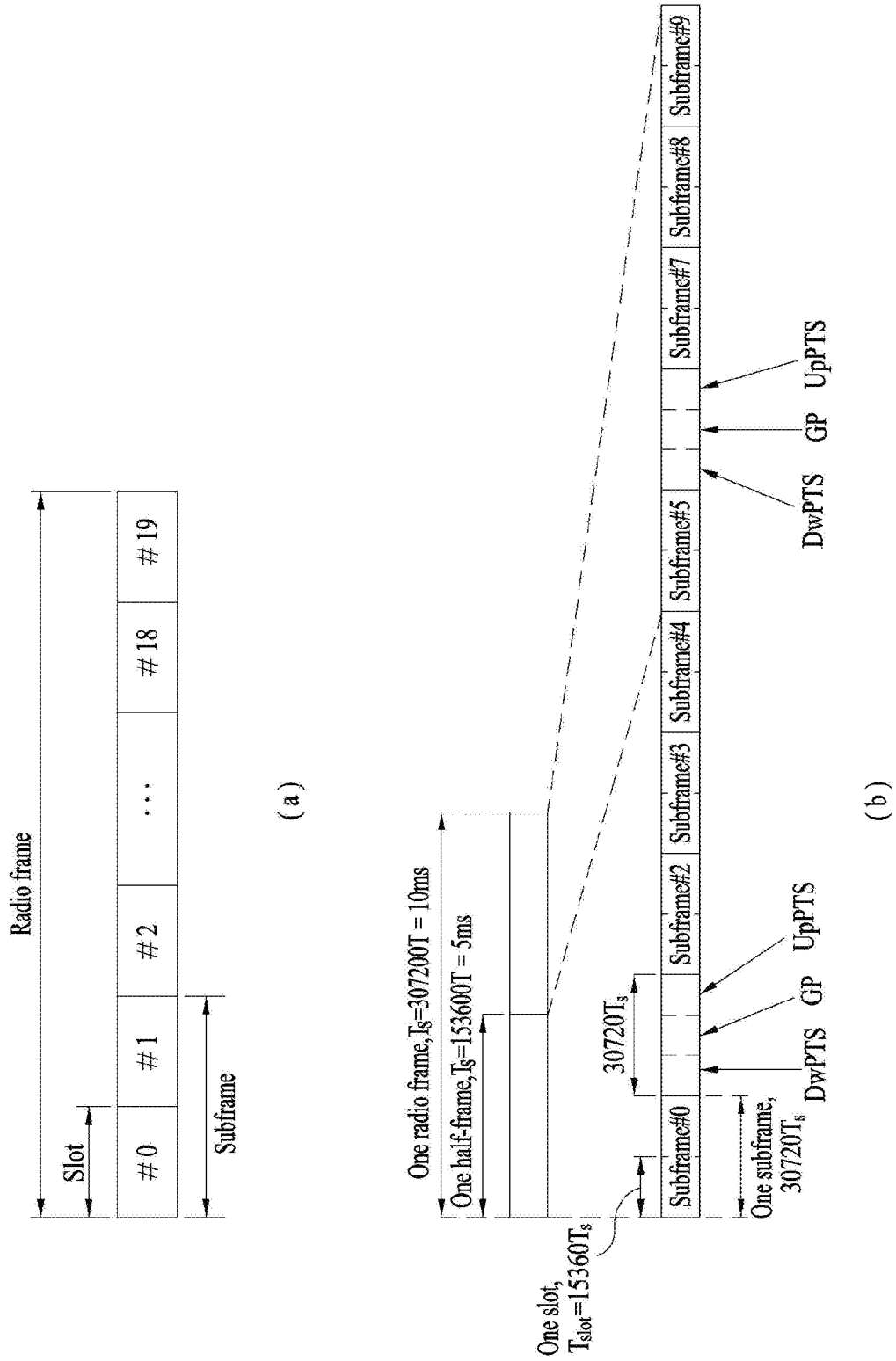
FIG. 1 is diagram illustrating an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |

TABLE 2-continued

|  | Normal cyclic prefix in downlink | | | Extended cyclic prefix in downlink | | |
| --- | --- | --- | --- | --- | --- | --- |
|  |  | UpPTS | |  | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 3 | $24144 \cdot T_s$ |  |  | $25600 \cdot T_s$ |  |  |
| 4 | $26336 \cdot T_s$ |  |  | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ |  |  |
| 6 | $19760 \cdot T_s$ |  |  | $23040 \cdot T_s$ |  |  |
| 7 | $21952 \cdot T_s$ |  |  | $12800 \cdot T_s$ |  |  |
| 8 | $24144 \cdot T_s$ |  |  | — | — | — |
| 9 | $13168 \cdot T_s$ |  |  | — | — | — |

Figure 2:
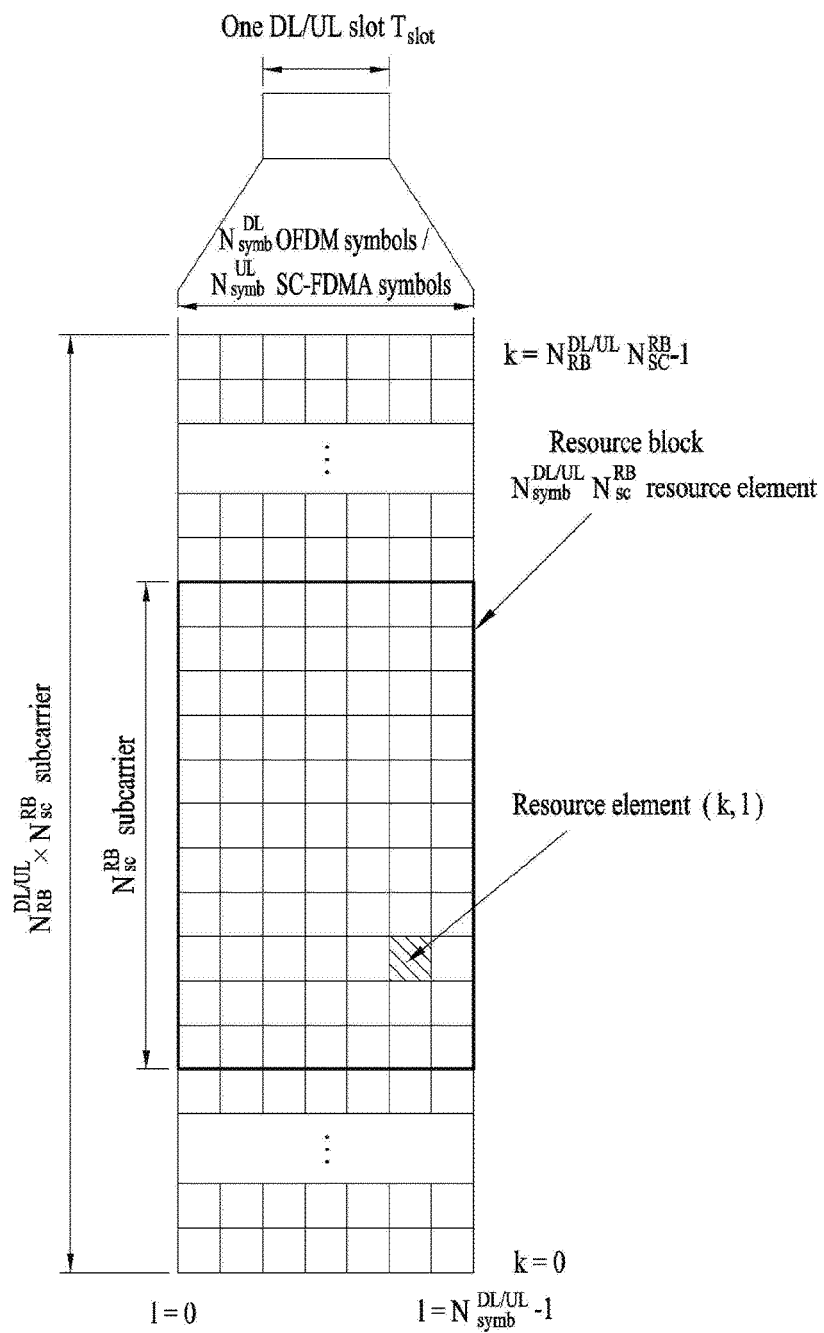
FIG. 2 is diagram illustrating an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index).

Figure 3:
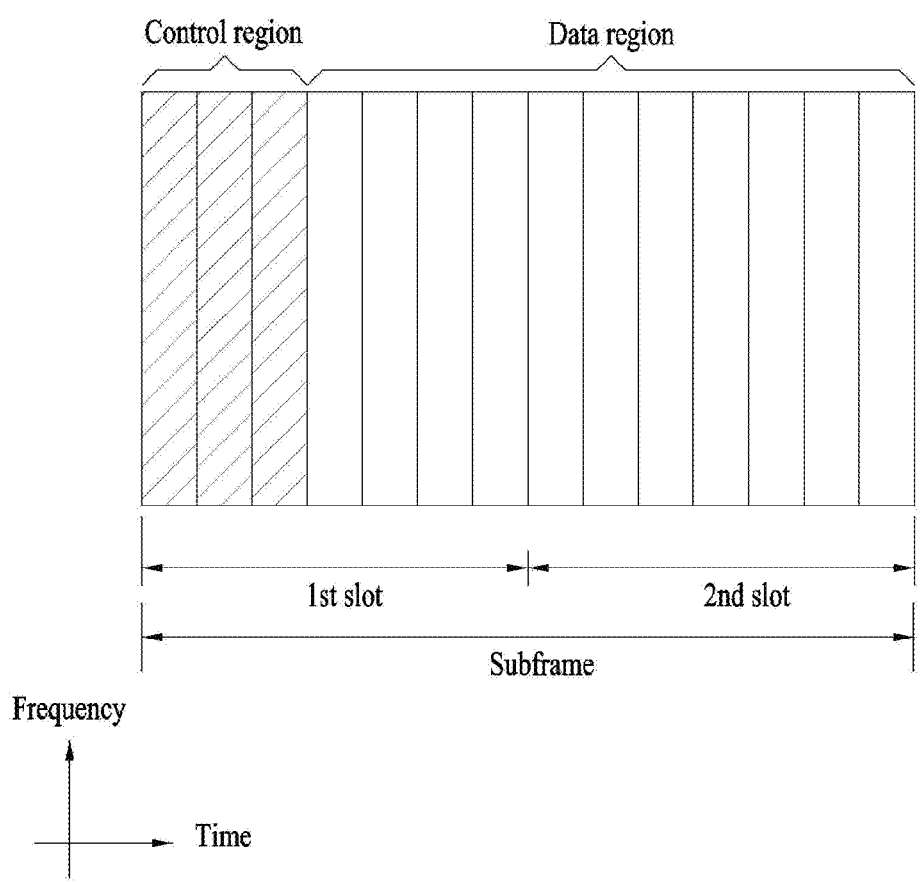
FIG. 3 is diagram illustrating an example of a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space | | Number of PDCCH candidates $M^{(L)}$ |
|---|---|---|---|
| | Aggregation Level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
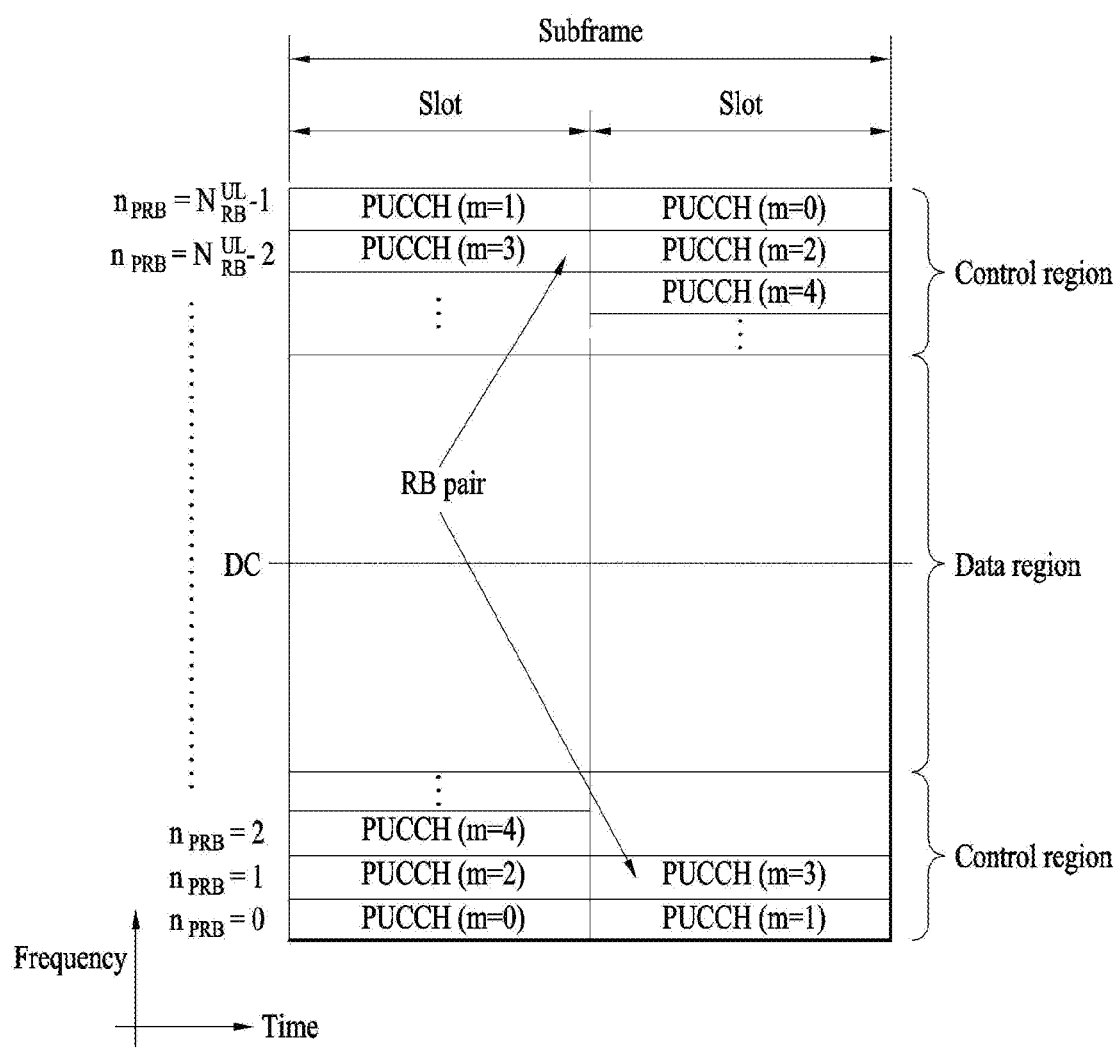
FIG. 4 is diagram illustrating an example of an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Coordinated Multi-Point (CoMP) Transmission and Reception

According to improved system performance requirements of a 3GPP LTE-A system, CoMP transmission/reception technology (co-MIMO, collaborative MIMO or network MIMO) is proposed. CoMP technology may increase performance of a UE located at a cell edge and increase average sector throughput.

In general, in a multi-cell environment in which a frequency reuse factor is 1, performance and average sector throughput of a UE located at a cell edge may be reduced due to inter-cell interference (ICI). In order to reduce ICI, in a legacy LTE system, a method of enabling a UE located at a cell edge to have appropriate throughput and performance in an environment restricted by interference using a simple passive method such as fractional frequency reuse (FFR) via specific power control was applied. However, ICI is reduced or reused by a UE as a desired signal more preferably than reduction of frequency resources used per cell. In order to accomplish the above-described object, a CoMP transmission scheme is applicable.

The CoMP scheme applicable to downlink may be largely divided into a joint processing (JP) scheme and a coordinated scheduling/beamforming (CS/CB) scheme.

In the JP scheme, each point (BS) of a CoMP unit may use data. The CoMP unit refers to a set of BSs used in the CoMP scheme. The JP scheme may be classified into a joint transmission scheme and a dynamic cell selection scheme.

The joint transmission scheme refers to a scheme for simultaneously transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively cancel interference with another UE.

The dynamic cell selection scheme refers to a scheme for transmitting a PDSCH from one point (of the CoMP unit). That is, data transmitted to a single UE at a specific time is transmitted from one point and the other points in the coordinated unit do not transmit data to the UE at that time. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination among a plurality of geographically separated points. CoMP schemes applicable to uplink may be classified into Joint Reception (JR) and Coordinated Scheduling/Beamforming (CS/CB).

JR indicates that a plurality of reception points receives a signal transmitted through a PUSCH, the CS/CB scheme indicates that only one point receives a PUSCH, and user scheduling/beamforming is determined by the coordination of the cells of the CoMP unit.

A plurality of UL points (that is, receiving points (RPs)) is referred to as UL CoMP and a plurality of DL points (that is, transmitting points (TPs)) is referred to as DL CoMP.

The present invention relates to transferring, to a advanced receiver (AR) UE, a scheduling information of an interfering PDSCH being scheduled together with a desired PDSCH to assist interference cancellation (IC) capabilities of the advanced receiver.

In general, a cellular mobile communication system is an interference-limited system due to inter-cell interference in an urban environment and reaches system capacity limit. In addition, if a MIMO scheme, that is, an SU-MIMO scheme or a MU-MIMO scheme, is applied such that one eNB transmits a multi-layer signal of multiple beams, inter-layer interference in a cell is also a main factor for deciding system capacity limit. Therefore, in order to reduce inter-cell interference and intra-cell interference, standardization and development of a coordinated transmission and high-performance receiver scheme becomes important and numerous effects in that direction have been made.

A downlink CoMP scheme configures transmission beams such that inter-cell interference and intra-cell interference are minimized in a transmitter based on channel state information received from a receiver. In the downlink CoMP scheme, complexity of the UE in a data reception process is not increased, but performance of the CoMP scheme largely depends on accuracy of a channel state information report. The high-performance receiver scheme obtains better reception performance using properties of an interference signal at a receiver. In the high-performance receiver scheme, how the UE acquires information on the interference signal transmitted along with a signal (that is, a desired signal) scheduled thereto becomes important. Representative examples of the high-performance receiver scheme may include:

linear MMSE IRC receiver,
maximum likelihood detection receiver, and
interference cancellation receiver.

As performance increases, information on a larger number of interference signals is required. For example, in an iterative decoding interference cancellation receiver known to have highest performance, since a UE decodes an interference signal and regenerates an interference signal in order to cancel interference, all information for decoding the interference signal is necessary.

A certain level of detection capability is needed to cancel an interference signal. That is, an interference signal may be stably canceled when an interference packet is successfully decoded or when hard decision error probability of a coding symbol of an interference packet is less than a specific value. Accordingly, a modulation and coding scheme (MCS) of an interference signal should be determined in such a manner that an interfered device can stably receive the interference signal. That is, the MCS of each transmission signal should be determined in such a manner that both a UE scheduled to receive a corresponding DL signal and an interfered UE can stably receive the DL signal.

In the LTE system, an eNB transmits information required to decode a PDSCH, which corresponds to a desired signal, to a UE using DCI of a PDCCH. The PDCCH is transmitted by including CRC parity bits to detect an error. In order to indicate a UE to which the PDCCH is to be transmitted, the CRC parity bits are transmitted after being scrambled with a cell-RNTI (C-RNTI) allocated to the UE. The UE performs PDCCH decoding (i.e., blind decoding) a plurality of times on a PDCCH search space given to the UE, and determines that DCI in a corresponding PDCCH has PDSCH scheduling information (e.g., DL grant or UL grant) to be transmitted to the UE, if the decoded CRC parity bits has the C-RNTI allocated to the UE.

In a SU-MIMO transmission scheme of the LTE system, when two or more layers are transmitted, two transport blocks (TBs) are transmitted to apply inter-layer interference cancellation. If one of the two TBs is successfully decoded, the UE regenerates a transmission signal of the corresponding TB, takes it out from a reception signal, and decodes the other TB again in an environment where inter-layer interference is cancelled. To this end, DCI of SU-MIMO has MCS information, a new data indicator (NDI), and a redundancy version (RV) for each of TB1 and TB2.

FIG. 5 shows an example of the configuration of PDCCH in the LTE(-A) system. Information delivered on the PDCCH mainly includes DCI and CRC parity bits masked with a C-RNTI. Although the configuration of DCI differs depending on a DCI format according to a PDSCH transmission mode, FIG. 5 shows an example of DCI of SU-MIMO. The DCI includes a resource allocation (RA) field, HARQ process field, transmit power control (TPC) field, layer mapping information (LMI) field, and fields for transmitting MCS, NDI, and RV information of each TB.

Method for Transmitting Individual DCI in Single/Multi-Cell MU-MIMO Environment

Scheduling information of a plurality of PDSCHs co-scheduled in the same time-frequency resource in an LTE system is delivered through individual PDCCH. That is, if PDSCH1 transmitted to UE1 and PDSCH2 transmitted to UE2 are co-scheduled in the same resource, PDCCH1 that includes scheduling information of PDSCH1 is masked with C-RNTI1 allocated to UE1 and then transmitted to UE1 from a PDCCH space determined by C-RNTI1, and PDCCH2 that includes scheduling information of PDSCH2 is masked with C-RNTI2 allocated to UE2 and then transmitted to UE2 from a PDCCH space determined by C-RNTI2. Therefore, in order that UE1 which is an advanced receiver (AR) UE discovers scheduling information of co-scheduled interfering PDSCHs without additional PDCCH overhead, an overhearing method of PDCCH2 transmitted to UE2 may be considered.

In the following description, in view of UE1, PDSCH1 will be referred to as desired PDSCH, PDCCH1 will be referred to as desired PDCCH, PDSCH2 will be referred to as an interfering PDSCH, and PDCCH2 will be referred to as an interfering PDCCH. Also, DCI delivered through PDCCH2 will be referred to as interfering DCI.

Therefore, to order that the AR UE discovers PDCCH having scheduling information of the interfering PDSCH co-scheduled with PDCCH in the overhearing method, the AR UE should perform decoding for all PDCCH transmission spaces in accordance with various DCI formats. In this process, since the AR UE cannot know C-RNTI allocated to a UE targeted by each DCI, the AR UE disregards error detection based on CRC and determines how resource allocation of DCI is matched with resource allocation of desired PDCSH, whereby interfering PDSCHs which are likely to cancel interference are only subjected to decoding. In this case, the number of PDCCH blind decoding times is remarkably increased, whereby a problem occurs in throughput degradation according to increase of the probability of false alarm and complexity of UE are increased.

The number of OFDM symbols used for PDCCH in the LTE system is designated per subframe through PCFICH (physical control format indicator channel). That is, a size of a resource region to which PDCCH is transmitted may be varied per subframe. The number of REs used for PDCCH in a bandwidth system of 20 MHz is indicated as listed in Table 5 depending on the number of OFDM symbols used for PDCCH. In this case, it is assumed that 1 or 2 port CRS transmission is performed and three PHICH groups are allocated for PHICH. Also, a maximum number of control channel elements (CCEs) are determined depending on the number of OFDM symbols used for PDCCH in Table 5. REs of a control channel region are defined as a resource element group (REG) in such a manner that the other REs except RE for CRS transmission are grouped in a unit of 4 continuous REs. 9 REGs interleaved except REGs used for PCFICH and PHICH transmission are grouped to form CCE. As a result, CCE correspond to 36 REs.

TABLE 5

| The number of OFDM symbols for PDCCH | Maximum number of REs for PDCCH | Maximum number of CCEs for PDCCH |
| --- | --- | --- |
| 1 | 748 | 20 |
| 2 | 1948 | 54 |
| 3 | 3148 | 87 |

The PDCCH is transmitted through a plurality of CCEs which are aggregated. That is, as listed in Table 6, the PDCCH is transmitted by being mapped into REs of corresponding CCEs by aggregation of n=1, 2, 4 or 8 CCEs. The PDCCH of which aggregation level (AL) is n is transmitted through 'n' continuous CCEs by starting from the ith CCE that satisfies (i mod n=0). That is, the ath (a=0, 1, . . . ) PDCCH of AL=n is transmitted from resources from the a*nth CCE to the (a+1)*n−1th CCE.

TABLE 6

| PDCCH format | The number of CCEs | The number of resource element groups (REGs) | The number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

As a method for discovering scheduling information of co-scheduled interfering PDSCHs, in order that the AR UE uses an overhearing method for discovering PDCCH of the interfering PDSCHs through search for all control regions, the AR UE should have a capability capable of decoding 87 CCEs per AL in consideration of the case that a PDCCH region includes maximum three OFDM symbols in a system bandwidth of maximum 20 MHz. That is, the AR UE should perform decoding from a total of 161 PDCCH transmission resource candidates with respect to 87 AL=1 PDCCH candidates, 43 AL=2 PDCCH candidates, 21 AL=4 PDCCH candidates, and 10 AL=8 PDCCH candidates.

Table 7 illustrates a space of a PDCCH region, from which DCI format and corresponding DCI according to a PDSCH transmission mode (TM) are transmitted. Also, in each transmission mode of Table 7, a PDSCH transmission mode when scheduling is performed by TM independent DCI and a PDSCH transmission mode when scheduling is performed by TM dependent DCI are listed in the last column.

TABLE 7

| Transmission mode | DCI format | Search space | PDSCH transmission mode corresponding to PDCCH |
| --- | --- | --- | --- |
| Mode 1 | DCI format 1A | Common and UE-specific by C-RNTI | Single-antenna port, port 0 |
|  | DCI format 1 | UE-specific by C-RNTI | Single-antenna port, port 0 |
| Mode 2 | DCI format 1A | Common and UE-specific by C-RNTI | Transmission diversity |
|  | DCI format 1 | UE-specific by C-RNTI | Transmission diversity |
| Mode 3 | DCI format 1A | Common and UE-specific by C-RNTI | Transmission diversity |
|  | DCI format 2A | UE-specific by C-RNTI | Large delay CDD or transmission diversity |
| Mode 4 | DCI format 1A | Common and UE-specific by C-RNTI | Transmission diversity |
|  | DCI format 2 | UE-specific by C-RNTI | Closed-loop spatial multiplexing or transmission diversity |
| Mode 5 | DCI format 1A | Common and UE-specific by C-RNTI | Transmission diversity |
|  | DCI format 1D | UE-specific by C-RNTI | Multi-user MIMO |
| Mode 6 | DCI format 1A | Common and UE-specific by C-RNTI | Transmission diversity |
|  | DCI format 1B | UE-specific by C-RNTI | Closed-loop spatial multiplexing based on single transmission layer |
| Mode 7 | DCI format 1A | Common and UE-specific by C-RNTI | If the number of PBCH antenna ports is one, single antenna port, port 0 is used, and if not so, transmission diversity is used. |
|  | DCI format 1 | UE-specific by C-RNTI | Single-antenna port, port 5 |
| Mode 8 | DCI format 1A | Common and UE-specific by C-RNTI | If the number of PBCH antenna ports is one, single antenna port, port 0 is used, and if not so, transmission diversity is used. |
|  | DCI format 2B | UE-specific by C-RNTI | Double layer transmission, ports 7 and 8, or single-antenna port, port 7 or 8 |
| Mode 9 | DCI format 1A | Common and UE-specific by C-RNTI | Non-MBSFN subframe: If the number of PBCH antenna ports is one, single antenna port, port 0 is used, and if not so, transmission diversity is used. MBSFN subframe: single-antenna port, port 7 |
|  | DCI format 2C | UE-specific by C-RNTI | Up to transmission of 8 layers, ports 7 to 14 or single-antenna port, port 7 or 8 |
| Mode 10 | DCI format 1A | Common and UE-specific by C-RNTI | Non-MBSFN subframe: If the number of PBCH antenna ports is one, single antenna port, port 0 is used, and if not so, transmission diversity is used. MBSFN subframe: single-antenna port, port 7 |
|  | DCI format 2D | UE-specific by C-RNTI | Up to transmission of 8 layers, ports 7 to 14 or single-antenna port, port 7 or 8 |

In the LTE system, a size of DCI, that is, the number of bits is varied depending on DCI format. Therefore, if transmission modes of co-scheduled interfering PDSCHs are not notified to the AR UE previously, the AR UE should perform decoding to be matched with a size of all DCI formats available from each PDCCH transmission resource candidate.

DCI for PDSCH scheduling of each transmission mode may be transmitted by either DCI format 1A which is TM independent DCI or DCI formats 1/1B/1D/2/2A/2B/2C/2D which are TM dependent DCI. The TM independent DCI and the TM dependent DCI are different from each other in their sizes. Therefore, even in the case that the transmission modes of the interfering PDSCHs are notified to the AR UE, the AR UE should individually perform decoding according to two DCI sizes for the same PDCCH transmission resource candidate.

Also, each DCI is determined whether to include the following kinds of information depending on SRS configuration and CA (carrier aggregation) configuration of a UE targeted by the interfering PDSCHs.

Carrier indicator field (CIF)
DL assignment index (DAI)
SRS request

Therefore, if the AR UE that overhears PDCCH of the interfering PDSCH does not know whether the corresponding DCI includes the information listed above, the AR UE should make a candidate set of DCI size in consideration of all possibilities and perform decoding for each candidate.

Therefore, the present invention is intended to reduce complexity and improve additional throughput by additionally applying a plurality of the following scheduling restrictions. The plurality of following restrictions may be applied at the same time.

1) An eNB uses the same transmission mode among PDSCHs which are co-scheduled. Therefore, the AR UE considers only DCI formats of PDCCH for transmission mode of a desired PDSCH during PDCCH search for the interfering PDSCH. That is, the UE assumes that a transmission mode of the desired PDSCH is the same as that of the interfering PDSCH.

2) The eNB uses the same transmission mode and transmission scheme for co-scheduled PDSCHs. Therefore, the AR UE assumes that a transmission scheme of the desired PDSCH is the same as that of the interfering PDSCH. Therefore, if the desired PDSCH is scheduled by DCI format 1A, the UE attempts search at a size of the corresponding DCI by determining that the interfering PDSCH will also be scheduled by DCI format 1A, and if the desired PDSCH is scheduled by TM dependent DCI, the UE attempts search at a size of the corresponding DCI by determining that the interfering PDSCH will also be scheduled by the TM dependent DCI.

3) Additionally, in the above 1) and 2), it is assumed that whether carrier indicator, DL assignment index and SRS request information are included in DCI of the desired PDCCH or the interfering PDCCH is equally applied to the desired PDCCH and the interfering PDCCH. Alternatively, whether carrier indicator, DL assignment index and SRS request information are included in DCI of the interfering PDCCH is notified from the eNB to the AR UE through RRC signaling.

4) The transmission mode or scheme of the interfering PDSCH is previously designated to the AR UE to allow the AR UE to consider only the corresponding DCI format during PDCCH search for the interfering PDSCH. Alternatively, the transmission mode or scheme of the interfering PDSCH is determined depending on the transmission mode of the desired PDSCH. Also, whether carrier indicator, DL assignment index and SRS request information are included in DCI of the interfering PDCCH is notified from the eNB to the AR UE through RRC signaling.

5) Transmission modes or schemes of a plurality of interfering PDSCHs are previously designated to the AR UE by a TM set to allow the AR UE to consider only DCI formats related to the corresponding TM set during PDCCH search for the interfering PDSCH. That is, the eNB forms the TM set in consideration of transmission modes/schemes of UEs, which are likely to be co-scheduled, and notifies the AR UE of the TM set. Alternatively, the eNB allows the TM set of the transmission modes or schemes of the interfering PDSCH to be determined depending on the transmission mode of the desired PDSCH.

6) A DCI set for DCI formats and sizes of a plurality of interfering PDCCHs is previously designated to the AR UE to allow the AR UE to consider only the DCI format and size within the corresponding set during PDCCH search for the interfering PDSCH. That is, the eNB notifies the AR UE of a candidate set of DCI format in consideration of transmission modes of UEs, which are likely to be co-scheduled, CA configuration and SRS configuration. Whether carrier indicator, DL assignment index and SRS request information are included in DCI of the interfering PDCCH is also designated in the candidate set of DCI format to indicate the size of the DCI.

7) The AR UE assumes that PDCCH of the co-scheduled interfering PDSCHs is always transmitted through a common search space. The eNB transmits the corresponding PDCCH through the common search space to deliver the corresponding PDCCH to an interfered UE in addition to a target UE.

8) The eNB notifies the AR UE of one or more interfering C-RNTIs which will be used for the interfering PDCCH of the interfering PDSCH, and allows the AR UE to search for the interfering PDCCH of the interfering PDSCH within a search space determined by the designated interfering C-RNTI. At this time, the AR UE identifies whether CRC of PDCCH decoding result is the same as the designated C-RNTI and disregards the corresponding PDCCH if CRS of PDCCH decoding result is different from the designated C-RNTI.

9) The AR UE assumes that DCI format 1A which is TM independent DCI is transmitted through only a common search space. That is, the AR UE may perform decoding by assuming TM independent DCI format and TM dependent DCI format on a common search space, and may perform decoding by assuming only TM dependent DCI format in the other areas other than the common search space.

10) The AR UE assumes that PDCCH of the co-scheduled interfering PDSCHs is transmitted through a specific AL. As a main example, it is assumed that the PDCCH of the interfering PDSCH is transmitted through AL=4 or 8. In this case, the AR UE performs decoding for only a total of 31 PDCCH transmission resource candidates of 21 AL=4 PDCCH candidates and 10 AL=8 PDCCH candidates in accordance with each DCI format.

11) The eNB designates a PDCCH transmission resource candidate set per AL and a candidate set of interfering DCI format/size and notifies the AR UE of the designated candidate sets. The eNB may notify the AR UE of the PDCCH transmission resource candidate set and an EPDCCH transmission resource candidate set separately from each other. The eNB may individually designate PDCCH/EPDCCH transmission resource candidate set per subframe or subframe set. In this way, the AR UE searches for the interfering PDCCH from only the PDCCH transmission resource candidate set in subframe set 0, and searches for the interfering EPDCCH from only the EPDCCH transmission resource candidate set in subframe 1.

By application of the aforementioned suggestion schemes, the AR UE should perform decoding for the PDCCH transmission resource candidate per AL of the control channel region in accordance with each size of DCI candidates of the interfering PDCCH. When the control channel region has a maximum size, and when the number of PDCCH transmission resource candidates is N and the number of candidates of DCI size of the interfering PDCCH is M, the AR UE should have a capability capable of performing decoding of a total of N*M times. However, this decoding capability is not all used for subframe in which an area of a control channel is set to be smaller than a maximum size. Therefore, in the aforementioned suggestion schemes, the number of PDCCH transmission resource candidates or the number of candidates of the DCI size of the interfering PDCCH is varied depending on the size of the control channel region. That is, if the size of the control channel region is configured by k OFDM symbols, N(k) PDCCH transmission resource candidates and M(k) candidates of the interfering DCI size are designated. Therefore, the AR UE performs decoding of N(k)*M(k) times, which is configured within the decoding capability of the UE. In the suggestion scheme, if the size k of the control channel region becomes smaller, the value of N(k) becomes smaller, whereby the candidates M(k) of the interfering DCI size may be increased. For this suggestion scheme, the eNB designates the PDCCH transmission resource candidate set and the candidate set of the interfering DCI format/size in accordance with the size k of the control channel region and notifies the AR UE of the designated candidate sets.

In the aforementioned suggestion schemes, interfering PDCCH/EPDCCH decoding capability of the AR UE, that is, maximum decoding times of the interfering PDCCH/EPDCCH are defined previously. The eNB notifies the AR UE of the PDCCH/EPDCCH transmission resource candidate set and the candidate set of the interfering DCI format/size without exceeding the maximum decoding times. As modified methods, the following schemes may be considered.

The AR UE reports a capability of maximum decoding times of the interfering PDCCH/EPDCCH when reporting a UE capability. The eNB designates the PDCCH/EPDCCH transmission resource candidate set and the candidate set of the interfering DCI format/size in consideration of the reported capability of maximum decoding times. That is, the AR UE reports the capability of maximum decoding times of the interfering PDCCH and the capability of maximum decoding times of the interfering EPDCCH together when reporting the UE capability. In this case, the eNB may set the sum of the number of PDCCH transmission resource candidates and the number of EPDCCH transmission resource candidates within one subframe to be smaller than or the same as the maximum decoding capability of the AR UE.

The AR UE separately reports a capability of maximum decoding times of the interfering PDCCH and a capability of maximum decoding times of the interfering EPDCCH when reporting a UE capability. In this case, the eNB may set each of the number of PDCCH transmission resource candidates and the number of EPDCCH transmission resource candidates within one subframe to be smaller than or the same as the maximum decoding capability of the AR UE.

The AR UE reports a plurality of possible combinations of a capability of maximum decoding times of the interfering PDCCH and a capability of maximum decoding times of the interfering EPDCCH when reporting a UE capability. That is, the AR UE respectively reports maximum decoding times corresponding to the case that the interfering PDCCH is only decoded, maximum decoding times corresponding to the case that the interfering EPDCCH is only decoded, and maximum decoding times corresponding to the case that the interfering PDCCH and the interfering EPDCCH are simultaneously decoded. In this case, the eNB may set a combination of the number of PDCCH transmission resource candidates and the number of EPDCCH transmission resource candidates within one subframe to be smaller than or the same as the maximum decoding combination capability of the AR UE.

In the suggested method, since the AR UE cannot know C-RNTI given to a UE targeted by each DCI, the AR UE fails to perform error check by using CRC covered from C-RNTI. Therefore, the AR UE may cancel CRC from the "CRC part covered from C-RNTI" and discover C-RNTI by calculating CRC bits on the assumption that a DCI part has been well decoded from PDCCH/EPDCCH decoded bits without error. The discovered C-RNTI is used to generate PDSCH scrambling sequence for decoding of the interfering PDSCH. In this process, a decoding reliability check dependent on a size of a final trellis branch metric of a convolution decoder of the PDCCH/EPDCCH is performed to assume or determine that the DCI part has been well decoded from the PDCCH/EPDCCH decoded bits without error. In this case, trellis decoding is one of maximum-likelihood decoding methods for error correction. The trellis decoding is a time-indexing graph illustrating a given linear code, and establishes one-to-one correspondence among codewords and paths from the start to the end of trellis (that is, lattice). If there is an error in a code, bit-error possibility is associated with a weight value on each edge of the lattice, whereby a problem of maximum-likelihood decoding is reduced to an issue of discovering a minimum-weight path from the start to the end within the lattice. If the final trellis branch metric of the PDCCH/EPDCCH decoder does not exceed a certain threshold value, the AR UE determines that valid DCI has not been transmitted from the corresponding PDCCH/EPDCCH resource candidate.

As a method for identifying successful decoding of the interfering PDCCH/EPDCCH, it is determined that valid DCI has been detected only if a specific field of the interfering DCI satisfies the following conditions.

The case that a transmission RB of the interfering PDSCH indicated by a resource block (RB) allocation field of the interfering DCI is designated equally to a transmission RB of the desired PDSCH, or, the case that the transmission RB of the interfering PDSCH is designated to include the transmission RB of the desired PDSCH, or the case that C-RNTI of the interfering DCI, which is obtained by CRC cancellation, is included in co-scheduled C-RNTI set and previously notified from the eNB.

As additional suggestion scheme, the eNB notifies the UE of a plurality of PDCCH/EPDCCH resource candidates and candidate sets of interfering DCI format/size, and notifies the UE whether a set to which the interfering PDCCH/EPDCCH belongs within the current subframe will be discovered through the desired PDCCH. In this case, the eNB configures a set such that decoding times desired for a UE per set does not exceed the capability of maximum decoding times of the UE.

As a modified scheme, the eNB notifies the UE of transmission modes or schemes of a plurality of interfering PDSCHs, and notifies the AR UE of a transmission mode or scheme of co-scheduled PDSCHs within the current subframe through the desired PDCCH. As listed in Table 8, the eNB notifies the AR UE of a transmission mode or scheme of the co-scheduled interfering PDSCHs through a specific field, "Co-PDSCH TM indication field" of DCI of the desired PDCCH, and the AR UE identifies scheduling information of the interfering PDSCHs by searching for only DCI for a designated transmission mode or scheme from the PDCCH/EPDCCH transmission resource candidates. As listed in Table 8, a transmission mode or scheme substantially designated by "Co-PDSCH TM indication field" may previously be notified to the AR UE through RRC signaling. Alternatively, the transmission mode or scheme of the interfering PDSCHs may previously be designated in accordance with the transmission mode of the AR UE.

TABLE 8

| Value of Co-PDSCH TM indication field | Description |
|---|---|
| '00' | Transmission mode (or scheme) the same as that of desired PDSCH |
| '01' | First TM (or scheme) configured by higher layer signaling |
| '10' | Second TM (or scheme) configured by higher layer signaling |
| '11' | Third TM (or scheme) configured by higher layer signaling |

As additional suggestion scheme, the eNB notifies the UE of an aggregation level of PDCCH/EPDCCH having scheduling information of co-scheduled interfering PDSCHs and a corresponding CCE from which the PDCCH/EPDCCH is transmitted, through a specific field of the desired PDCCH. That is, in consideration of the case that PDSCH1 transmitted to UE1 and PDSCH2 transmitted to UE2 are co-scheduled at the same resource, the eNB transmits PDCCH1, which includes scheduling information of PDSCH1, by masking with C-RNTI1 allocated to UE1, and transmits PDCCH2, which includes scheduling information of PDSCH2, by masking with C-RNTI2 allocated to UE2. In this case, in the suggestion scheme, an aggregation level of PDCCH2 and information on CCE index to which PDCCH2 is transmitted are notified through a specific field of PDCCH1. Therefore, the UE1 searches for PDCCH1 transmitted thereto and identifies a position of PDCCH or EPDCCH (that is, PDCCH2), which has scheduling information of the interfering PDSCH (that is, PDSCH2), through DCI of PDCCH1.

Alternatively, as additional suggestion scheme, the eNB notifies the UE of a corresponding CCE from which the PDCCH2 having scheduling information of co-scheduled interfering PDSCHs is transmitted, through a specific field of PDCCH1. At this time, an aggregation level is equally maintained in the PDCCH1 and the PDCCH2. That is, the UE may search for PDCCH1 masked with its C-RNTI from a search space given thereto per aggregation level and decode PDCCH2 at the same CCE position notified to the corresponding PDCCH1 at the same aggregation level as that of the PDCCH1. Also, in this case, the PDCCH1 and the PDCCH2 have the same DCI format, or DCI format of the PDCCH2 is previously allocated to the PDCCH2 independently from DCI format of the PDCCH1. Alternatively, the PDCCH1 indicates a CCE position of the PDCCH2 and DCI format of the PDCCH2.

As a corrected suggestion scheme, the UE1 which is the AR UE identifies AL of the PDCCH2, which has scheduling information of co-scheduled interfering PDSCHs, from AL of the PDCCH1. For example, if the UE1 is the AR UE and the UE2 is a normal UE, the UE1 needs information of both the PDCCH1 and the PDCCH2, whereas the UE2 has only to receive only information of the PDCCH2. In this case, the eNB co-schedules PDSCHs of the two UEs only if the AL of the PDCCH2 is always greater than the AL of the PDCCH1. Therefore, the UE1 which is the AR UE first searches for the PDCCH1 and then searches for the PDCCH2 at the transmission resource position of PDCCH of which AL is greater than AL of the detected PDCCH1.

As information previously designated in the suggestion scheme and information indicated by the PDCCH1, decoding of the PDCCH2 is attempted and C-RNTI2 masked with CRC of the PDCCH2 is obtained. The C-RNTI2 obtained as above is used to obtain a scrambling code of the PDSCH2 which is scheduled in the PDCCH2. In this case, coded bits of the PDSCH2 are scrambled for randomization, and the scrambling code which is used at this time is generated by application of C-RNTI2.

In the above description, the PDCCH2 may be transmitted from a normal PDCCH transmission resource or EPDCCH transmission resource.

A schematic diagram of DCI according to this suggestion scheme is shown in FIG. 6. The position and DCI format of the PDCCH/EPDCCH having scheduling information of co-scheduled PDSCHs are indicated through an extended PDCCH information field which is added.

Figure 7:
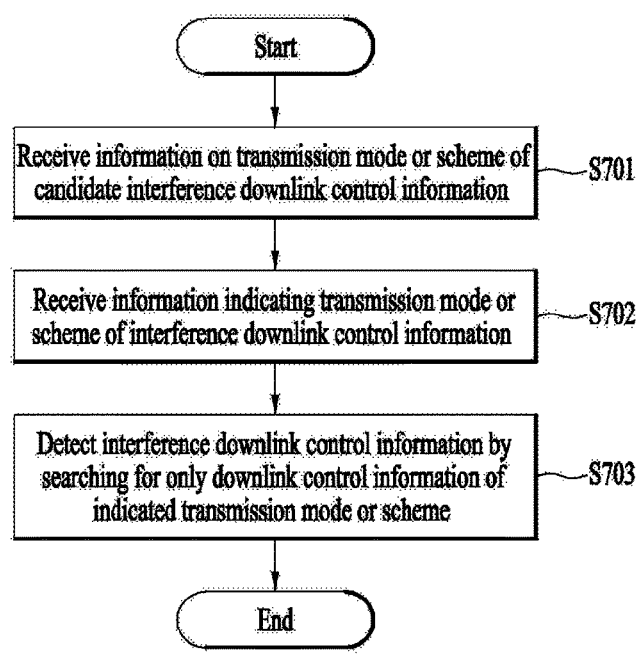
FIG. 7 is diagram illustrating an operation according to one embodiment of the present invention.

FIG. 7 is diagram illustrating an operation according to one embodiment of the present invention.

FIG. 7 relates to a method for receiving interference downlink control information of a UE having an interference cancellation capability in a wireless communication system according to one embodiment of the present invention.

The UE may receive information on a transmission mode or scheme of candidate interference downlink control information from the eNB (S701). The UE may receive information indicating the transmission mode or scheme of the candidate interference downlink control information or the same transmission mode or scheme as downlink control information for itself from the eNB as the transmission mode or scheme of the interference downlink control information (S702). The UE may detect interference downlink control information by searching for only downlink control information of the transmission mode or scheme of the indicated interference downlink control information (S703). The indicated information may be included in a specific field of the downlink control information for the UE.

The UE may determine that the detected interference downlink control information is valid if a resource block assignment field of the detected interference downlink control information includes or is the same as a resource block assignment field of the downlink control information for the UE.

The UE may determine that the detected interference downlink control information is valid if an interference C-RNTI (Cell Radio Network Temporary Identity) derived from bits corresponding to the detected interference downlink control information belongs to a candidate interference C-RNTI set received from the eNB.

The UE may derive interference C-RNTI (Cell Radio Network Temporary Identity) from bits corresponding to the detected interference downlink control information. The derived interference C-RNTI may be used to acquire a scrambling code for interference downlink data information scheduled by the interference downlink control information.

Additionally or alternatively, the UE may receive information on an aggregation level or resource position of the interference downlink control information.

Additionally or alternatively, the aggregation level of the interference downlink control information may be greater than that of downlink control information for the UE.

Additionally or alternatively, the UE may report a capability of maximum decoding times of its interference downlink control information to the eNB.

Although the embodiments according to the present invention have been briefly described with reference to FIG. 7, the embodiment related to FIG. 7 may include at least a part of the aforementioned embodiment(s) alternatively or additionally.

Figure 8:
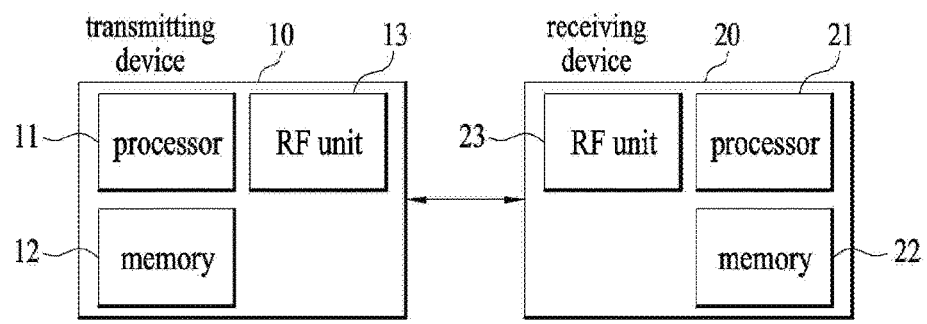
FIG. 8 is a block diagram illustrating an apparatus for implementing the embodiment(s) of the present invention.

FIG. 8 is a block diagram of a transmitting device 10 and a receiving device 20 configured to implement exemplary embodiments of the present invention. Referring to FIG. 8, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may perform an operate a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention is applicable to a wireless communication device such as a user equipment (UE), relay, or base station (BS).

What is claimed is:

1. A method for detecting interference downlink control information of a terminal having an interference cancellation capability in a wireless communication system, the method comprising:

receiving, from a base station, information on candidate transmission modes or schemes of the interference downlink control information;

reporting a capability of a maximum number of times of decoding the interference downlink control information of the terminal to the base station;

receiving, from the base station, information informing that a transmission mode or scheme of the interference downlink control information is one of the candidate transmission modes or schemes, or informing that the transmission mode or scheme of the interference downlink control information is the same as a desired downlink control information for the terminal; and detecting the interference downlink control information by searching a search space only for the downlink control information of the informed transmission mode or scheme of the interference downlink control information.

2. The method according to claim 1, further comprising determining that the detected interference downlink control information is valid when a resource block allocation field of the detected interference downlink control information includes or is the same as a resource block allocation field of the desired downlink control information for the terminal.

3. The method according to claim 1, further comprising determining that the detected interference downlink control information is valid when an interference Cell Radio Network Temporary Identity (C-RNTI) derived from bits corresponding to the detected interference downlink control information belongs to a candidate interference C-RNTI set received from the base station.

4. The method according to claim 1, further comprising deriving interference Cell Radio Network Temporary Identity (C-RNTI) from bits corresponding to the detected interference downlink control information, wherein the derived interference C-RNTI is used to acquire a scrambling code for interference downlink data information scheduled by the interference downlink control information.

5. The method according to claim 1, wherein the information informing the transmission mode or scheme is included in a specific field of the desired downlink control information for the terminal.

6. The method according to claim 1, further comprising receiving information on an aggregation level or resource position of the interference downlink control information.

7. The method according to claim 1, wherein an aggregation level of the interference downlink control information is greater than an aggregation level of the desired downlink control information for the terminal.

8. A terminal having an interference cancellation capability, configured to detect interference downlink control information in a wireless communication system, the terminal comprising:

a receiver and transmitter; and a processor, operatively coupled to the receiver and transmitter and configured to:

control the receiver to receive, from a base station, information on candidate transmission modes or schemes of the interference downlink control information, control the transmitter to report a capability of a maximum number of times of decoding the interference downlink control information of the terminal to the base station, control the receiver to receive, from the base station, information informing that a transmission mode or scheme of the interference downlink control information is one of the candidate transmission modes or schemes, or informing that the transmission mode or scheme of the interference downlink control information is the same as a desired downlink control information for the terminal, and detect the interference downlink control information by searching a search space only for the downlink control information of the informed transmission mode or scheme of the interference downlink control information.

9. The terminal according to claim 8, wherein the processor determines that the detected interference downlink control information is valid when a resource block allocation field of the detected interference downlink control information includes or is the same as a resource block allocation field of the desired downlink control information for the terminal.

10. The terminal according to claim 8, wherein the processor is further configured to determine that the detected interference downlink control information is valid when an interference Cell Radio Network Temporary Identity (C-RNTI) derived from bits corresponding to the detected interference downlink control information belongs to a candidate interference C-RNTI set received from the base station.

11. The terminal according to claim 8, wherein the processor is further configured to derive interference Cell Radio Network Temporary Identity (C-RNTI) from bits corresponding to the detected interference downlink control information, and the derived interference C-RNTI is used to acquire a scrambling code for interference downlink data information scheduled by the interference downlink control information.

12. The terminal according to claim 8, wherein the information informing the transmission mode or scheme is included in a specific field of the desired downlink control information for the terminal.

13. The terminal according to claim 8, wherein the processor is further configured to control the receiver to receive information on an aggregation level or resource position of the interference downlink control information.

14. The terminal according to claim 8, wherein an aggregation level of the interference downlink control information is greater than an aggregation level of the desired downlink control information for the terminal.

* * * * *